United States Patent
Smith, III et al.

(10) Patent No.: US 10,767,559 B2
(45) Date of Patent: Sep. 8, 2020

(54) ADAPTIVE-AREA INERTIAL PARTICLE SEPARATORS

(71) Applicant: Rolls-Royce North American Technologies, Inc., Indianapolis, IN (US)

(72) Inventors: Crawford F. Smith, III, Carmel, IN (US); Bryan H. Lerg, Carmel, IN (US); Kenneth M. Pesyna, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 259 days.

(21) Appl. No.: 16/020,251

(22) Filed: Jun. 27, 2018

(65) Prior Publication Data
US 2019/0301367 A1    Oct. 3, 2019

Related U.S. Application Data

(60) Provisional application No. 62/649,825, filed on Mar. 29, 2018.

(51) Int. Cl.
| | |
|---|---|
| F02C 7/05 | (2006.01) |
| B01D 45/08 | (2006.01) |
| B01D 45/16 | (2006.01) |
| F02C 7/052 | (2006.01) |
| F02C 7/042 | (2006.01) |
| F02C 7/055 | (2006.01) |

(52) U.S. Cl.
CPC .............. *F02C 7/052* (2013.01); *B01D 45/08* (2013.01); *B01D 45/16* (2013.01); *F02C 7/042* (2013.01); *F02C 7/055* (2013.01); *F05D 2220/323* (2013.01); *F05D 2260/606* (2013.01)

(58) Field of Classification Search
CPC .......... F02C 7/052; B01D 45/08; B01D 45/16
See application file for complete search history.

(56) References Cited

U.S. PATENT DOCUMENTS

| | | |
|---|---|---|
| 3,338,049 A | 8/1967 | Marshall |
| 3,444,672 A | 5/1969 | Alsobrooks |
| 3,465,950 A | 9/1969 | Freid et al. |
| 3,521,431 A | 7/1970 | Connors et al. |
| 3,534,548 A | 10/1970 | Connors |
| 3,616,616 A | 11/1971 | Flatt |
| 3,673,771 A | 7/1972 | Dickey |
| 3,733,814 A | 5/1973 | Hull, Jr. et al. |
| 3,778,983 A | 12/1973 | Rygg |
| 3,832,086 A | 8/1974 | Hull, Jr. et al. |

(Continued)

FOREIGN PATENT DOCUMENTS

EP    3121416 A1    1/2017

OTHER PUBLICATIONS

Extended European Search Report, European Application No. 19162516.9-1007, dated Apr. 19, 2019, 5 pages.

*Primary Examiner* — Robert A Hopkins
(74) *Attorney, Agent, or Firm* — Barnes & Thornburg LLP

(57) ABSTRACT

A particle separator adapted for use with a gas turbine engine includes an adaptive-area hub, an outer wall, and a splitter. The splitter cooperates with the adaptive-area hub and the outer wall to separate particles suspended in an inlet flow moving through the particle separator to provide a clean flow of air to the gas turbine engine.

20 Claims, 5 Drawing Sheets

(56) References Cited

U.S. PATENT DOCUMENTS

| | | |
|---|---|---|
| 3,970,439 A | 7/1976 | Murphy |
| 3,979,903 A | 9/1976 | Hull et al. |
| 3,998,048 A | 12/1976 | Derue |
| 4,509,962 A | 4/1985 | Breitman et al. |
| 4,592,765 A | 6/1986 | Breitman et al. |
| 4,617,028 A | 10/1986 | Ray et al. |
| 4,702,071 A | 10/1987 | Jenkins et al. |
| 4,704,145 A | 11/1987 | Norris et al. |
| 4,860,534 A | 8/1989 | Easley et al. |
| 4,881,367 A | 11/1989 | Flatman |
| 4,928,480 A | 5/1990 | Oliver et al. |
| 5,039,317 A | 8/1991 | Thompson et al. |
| 5,139,545 A | 8/1992 | Mann |
| 5,201,801 A * | 4/1993 | Smith, Jr. ................ F02C 7/05 60/226.1 |
| 5,279,109 A | 1/1994 | Liu et al. |
| 6,134,874 A | 10/2000 | Stoten |
| 6,499,285 B1 | 12/2002 | Snyder |
| 6,702,873 B2 | 3/2004 | Hartman |
| 7,608,122 B2 | 10/2009 | Snyder |
| 8,015,787 B2 | 9/2011 | Snyder |
| 9,046,056 B2 | 6/2015 | Lerg |
| 9,284,914 B2 | 3/2016 | Webster |
| 10,227,925 B2 * | 3/2019 | Snyder ................... F02C 7/057 |
| 2008/0047425 A1 | 2/2008 | Loda et al. |
| 2009/0139398 A1 | 6/2009 | Sheoran et al. |
| 2014/0237954 A1 | 8/2014 | Snyder |
| 2016/0102611 A1 | 4/2016 | Snyder |
| 2016/0265435 A1 | 9/2016 | Snyder |

* cited by examiner

ADAPTIVE-AREA INERTIAL PARTICLE SEPARATORS

CROSS REFERENCE TO RELATED APPLICATIONS

This application claims priority to and the benefit of U.S. Provisional Patent Application No. 62/649,825, filed 29 Mar. 2018, the disclosure of which is now expressly incorporated herein by reference.

FIELD OF THE DISCLOSURE

The present disclosure relates generally to gas turbine engines, and more specifically to particle separators adapted for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the fuel and air is ignited. Products of the combustion reaction in the combustor are directed into the turbine where work is extracted to drive the compressor and, sometimes, an output shaft. Leftover products of the combustion are exhausted out of the turbine and may provide thrust in some applications.

Air is drawn into the engine through an air inlet and communicated to the compressor via an air-inlet duct. In some operating conditions, particles may be entrained in the air such as dust, sand, ash, or water and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

One method of separating particles from air entering the compressor has been by inertial particle separation. Inertial particle separation uses the inertia of the particles to separate the particles from the air. As the air stream moves through the air-inlet duct, the air moves along a serpentine flow path and enters an engine channel of the air-inlet duct while the particles move along a generally linear travel path and enter a scavenge channel of the particle separator.

SUMMARY

The present disclosure may comprise one or more of the following features and combinations thereof.

A particle separator for use with a gas turbine engine may include an adaptive-area hub, an outer wall, and a splitter. The adaptive-area hub is arranged circumferentially about an axis of the particle separator to define an inner profile of the particle separator. The adaptive-area hub includes an inner wall arranged circumferentially about the axis, a plurality of outer slats arranged circumferentially about the inner wall, and a plurality of inner slats located radially between the inner wall and the plurality of outer slats. The outer wall is arranged circumferentially about the adaptive-area hub to define an inlet passageway between the outer wall and the adaptive-area hub. The inlet passageway is adapted to receive a mixture of air and particles suspended in the air. The splitter is located aft of the adaptive-area hub and configured to separate the mixture of air and particles into a clean flow substantially free of particles and a dirty flow containing the particles during operation of the particle separator.

The adaptive-area hub is configured to move between a non-austere position and an austere position. In the non-austere position, the plurality of inner slats is aligned circumferentially with the plurality of outer slats to cause the inner wall to provide the inner profile of the particle separator such that the inlet passageway has a first area. In the austere position, the plurality of inner slats is misaligned circumferentially with the plurality of outer slats to cause the plurality of inner slats and the plurality of outer slats to cooperate to provide the inner profile of the particle separator such that the inlet passageway has a second area smaller than the first area to encourage the particles into the dirty flow.

In some embodiments, each of the plurality of outer slats may be spaced apart circumferentially from a neighboring outer slat of the plurality of outer slats by an outer gap such that the plurality of outer slats define a plurality of outer gaps. In some embodiments, the plurality of inner slats may be positioned relative to the plurality of outer slats to close the plurality of outer gaps to block fluid flow radially through the plurality of outer gaps when the adaptive-area hub is in the austere position.

In some embodiments, each of the plurality of outer slats has a first circumferential width. Each of the plurality of inner slats has a second circumferential width. The first circumferential width may be about equal to the second circumferential width.

In some embodiments, each of the plurality of outer slats may be made of a strip of material. In some embodiments, each of the plurality of inner slats may be made of a strip of material.

In some embodiments, the particle separator further includes a control system. The control system may be configured to detect the presence of the particles suspended in the air and to move selectively the adaptive-area hub from the non-austere position to the austere position in response to detecting the presence of the particles suspended in the air.

In some embodiments, the plurality of inner slats may have a maximum radius relative to the axis. The inner wall may be spaced apart from the plurality of inner slats at an axial position corresponding with the maximum radius.

In some embodiments, each of the plurality of outer slats and each of the plurality of inner slats may be curvilinear. In some embodiments, the plurality of inner slats may be coupled to the inner wall for rotational movement with the inner wall relative to the axis.

According to another aspect of the present disclosure, a particle separator includes an adaptive-area hub, an outer wall, and a splitter. The adaptive-area hub includes an inner wall, a plurality of outer slats spaced apart from the inner wall, and a plurality of inner slats located between the plurality of outer slats and the inner wall. Each of the plurality of outer slats is spaced apart from a neighboring outer slat of the plurality of outer slats to define a plurality of outer gaps. Each of the plurality of inner slats is spaced apart from a neighboring inner slat of the plurality of inner slats to define a plurality of inner gaps. The outer wall is spaced apart from the inner wall to locate the plurality of outer slats between the inner wall and the outer wall. The splitter is located aft of the adaptive-area hub.

The adaptive-area hub may be movable between a non-austere position and an austere position. In the non-austere position, the plurality of inner slats and the plurality of outer slats are positioned relative to each other to cause the plurality of outer gaps and the plurality of inner gaps to be aligned. In the austere position, the plurality of inner slats and the plurality of outer slats are positioned relative to each other to cause the plurality of outer gaps and the plurality of inner gaps to be misaligned.

In some embodiments, the plurality of inner slats may be coupled to the inner wall for movement with the inner wall. In some embodiments, each of the plurality of inner slats may include side walls that extend away from the plurality of outer slats and toward the inner wall and the side walls may be couple with the inner wall.

In some embodiments, each of the plurality of outer slats have a first width and each of the plurality of inner slats have a second width. The first width may be about equal to the second width.

In some embodiments, the adaptive-area hub may be arranged circumferentially about an axis of the particle separator. In some embodiments, the inner wall may be annular and continuous.

In some embodiments, the particle separator further includes a control system. The control system may be configured to move selectively the adaptive-area hub from the non-austere position to the austere position in response to detecting a presence of particles suspended in air flowing through the particle separator.

According to another aspect of the present disclosure, a method includes a number of steps. The method includes providing a particle separator that includes an adaptive-area hub, an outer wall arranged around the adaptive-area hub to define an inlet passageway, and a splitter, the adaptive-area hub including an inner wall, a plurality of outer slats located between the inner wall and the outer wall, and a plurality of inner slats located between the plurality of outer slats and the inner wall, each of the plurality of outer slats is spaced apart from a neighboring outer slat of the plurality of outer slats to define a plurality of outer gaps between the plurality of outer slats, and each of the plurality of inner slats is spaced apart from a neighboring inner slat of the plurality of inner slats to define a plurality of inner gaps between the plurality of inner slats, and moving the plurality of inner slats relative to the plurality of outer slats to cause the plurality of inner gaps to be misaligned with the plurality of outer gaps.

In some embodiments, the method may further include moving the plurality of inner slats relative to the plurality of outer slats to cause the plurality of inner gaps to be aligned with the plurality of outer gaps. In some embodiments, the moving step may include rotating the plurality of inner slats relative to the plurality of outer slats.

These and other features of the present disclosure will become more apparent from the following description of the illustrative embodiments.

DETAILED DESCRIPTION OF THE DRAWINGS

Figure 1:
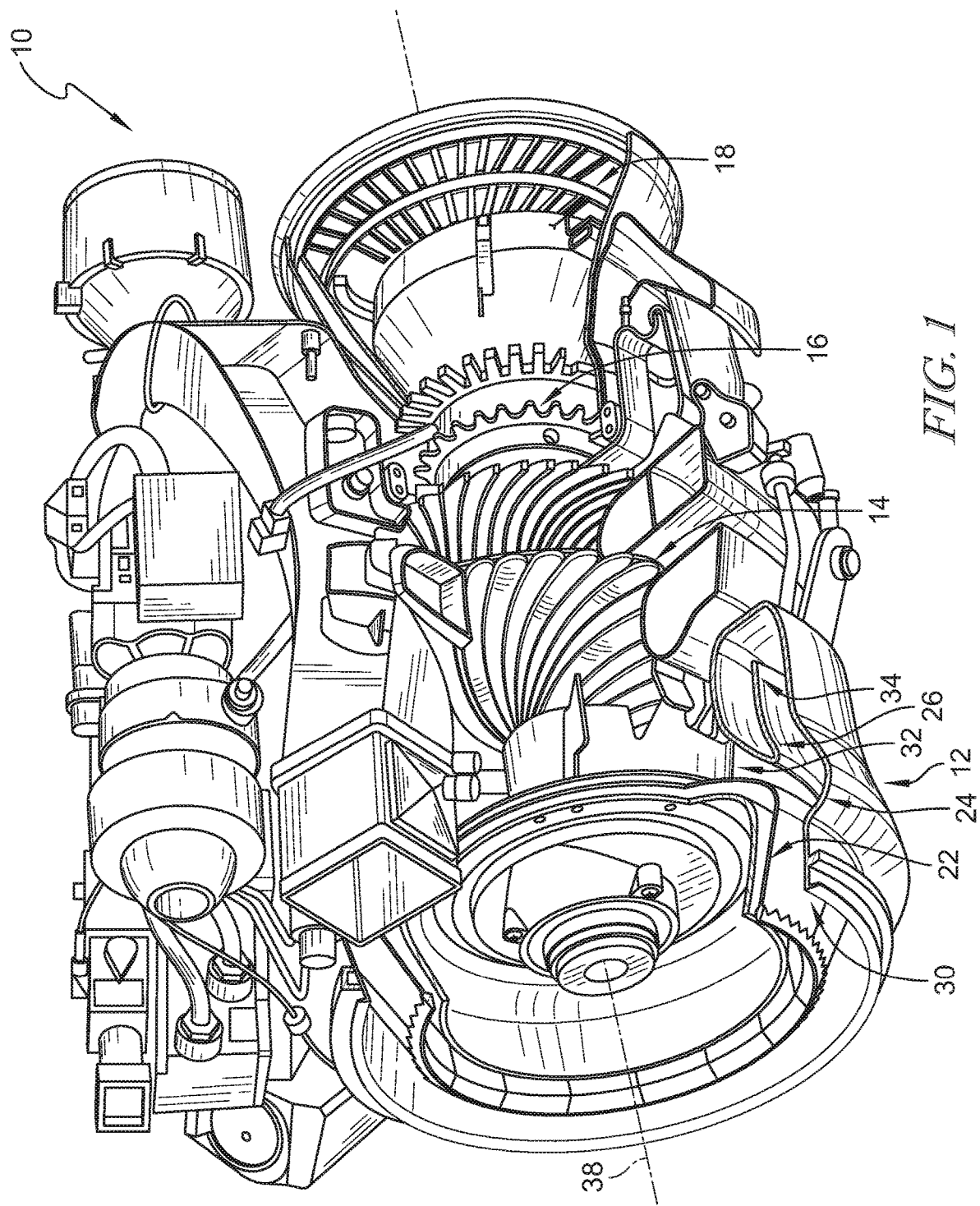
FIG. 1 is a cut-away perspective view of a gas turbine engine having a particle separator in accordance with the present disclosure, the gas turbine engine further including a compressor section, a combustor section, and a turbine section.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown, for example, in FIG. 1. The gas turbine engine 10 includes a particle separator 12, a compressor section 14, a combustor section 16, and a turbine section 18. A flow 36 of air is drawn into the gas turbine engine 10 through particle separator 12 prior to admission of the air into the compressor section 14 as suggested in FIGS. 1-4. The compressor section 14 compresses the air drawn into the engine 10 and delivers high-pressure air to the combustor section 16. The combustor section 16 is configured to ignite a mixture of the compressed air and fuel. Products of the combustion process are directed into the turbine section 18 where work is extracted to drive the compressor section 14 and a fan, propeller, output shaft, or gearbox.

In some environments, particles such as dirt, sand, ash, and/or water may be entrained in the air surrounding the engine 10. Such environments may be referred to as austere conditions. In contrast, environments having relatively low or no particles may be referred to as non-austere conditions. The particles may be carried into the gas turbine engine 10 and may damage and wear engine components. The illustrative particle separator 12 is configured to separate the particles from the air to provide clean air substantially free from particles to the compressor section 14 so that damage to the engine 10 is minimized.

Figure 2:
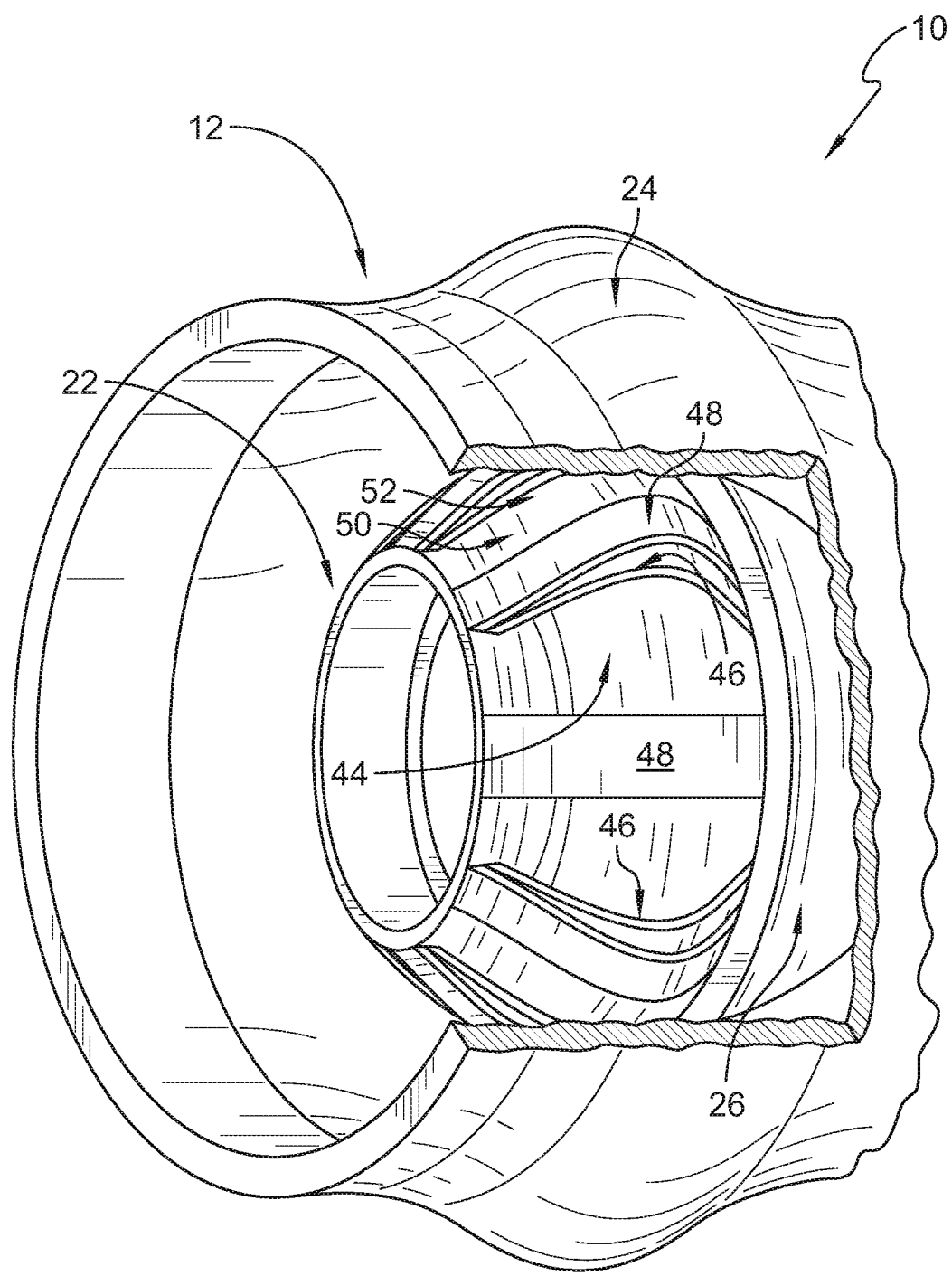
FIG. 2 is a perspective view of the particle separator of FIG. 1 with portions broken away to show that the particle separator includes an outer wall arranged around an adaptive-area hub having a plurality of outer slats, a plurality of inner slats configured to rotate relative to the outer slats, and an inner wall.
Figure 3:
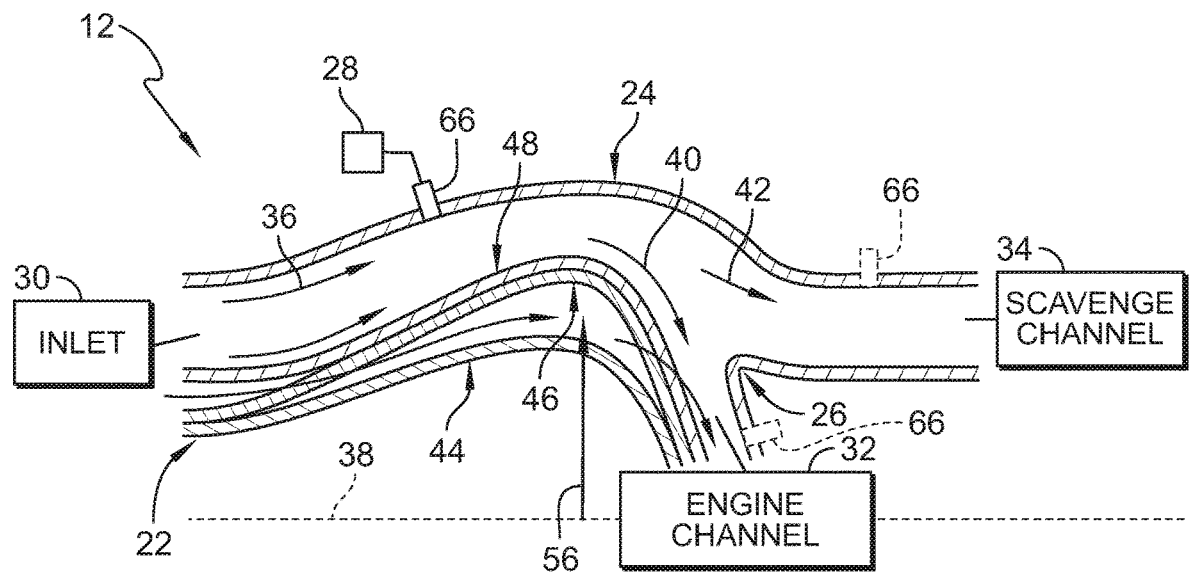
FIG. 3 is an enlarged section and diagrammatic view of the particle separator of FIG. 1 in a non-austere arrangement in which the particle separator has a small maximum effective radius upstream of the engine channel so that an area of an inlet passageway of the particle separator is relatively large to minimize pressure loss.
Figure 4:
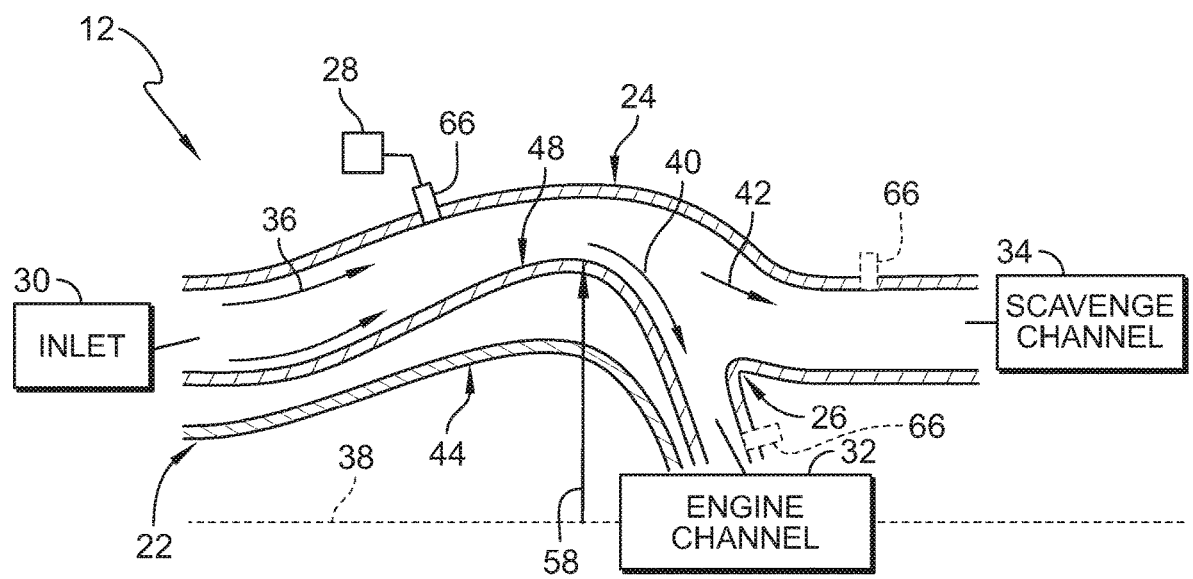
FIG. 4 is a view similar to FIG. 3 of the particle separator in an austere arrangement in which the particle separator has a large maximum effective radius upstream of the engine channel so that an area of an inlet passageway of the particle separator is relatively small to increase a velocity of air and particles entering the particle separator and encourage the particles to flow into a scavenge channel.

The illustrative particle separator 12 includes an adaptive-area hub 22, an outer wall 24 arranged circumferentially around the adaptive-area hub 22, a splitter 26, and a control system 28 as shown in FIGS. 2-4. The adaptive-area hub 22 and the outer wall 24 cooperate to define an air-inlet passageway 30 configured to receive the flow 36 of inlet air as suggested in FIGS. 3 and 4. The splitter 26 is configured to separate the flow 36 of air and particles that are conducted into the air-inlet passageway 30 into a clean flow 40 and a dirty flow 42 as suggested in FIGS. 3 and 4.

The adaptive-area hub 22 defines an inner profile of the particle separator 12 as suggested in FIGS. 3 and 4. When little or no particulates are present, such as, in non-austere conditions, it may be desirable to have an inner profile with a small maximum effective radius 56 so that the inlet passageway 30 has a large flow area when sectioned radially along a point on the axis 38 as suggested in FIGS. 3 and 5. The pressure loss for the engine 10 may be lower with large flow area and, thus, it may be desirable to have the large flow area unless particles are present.

Figure 6:
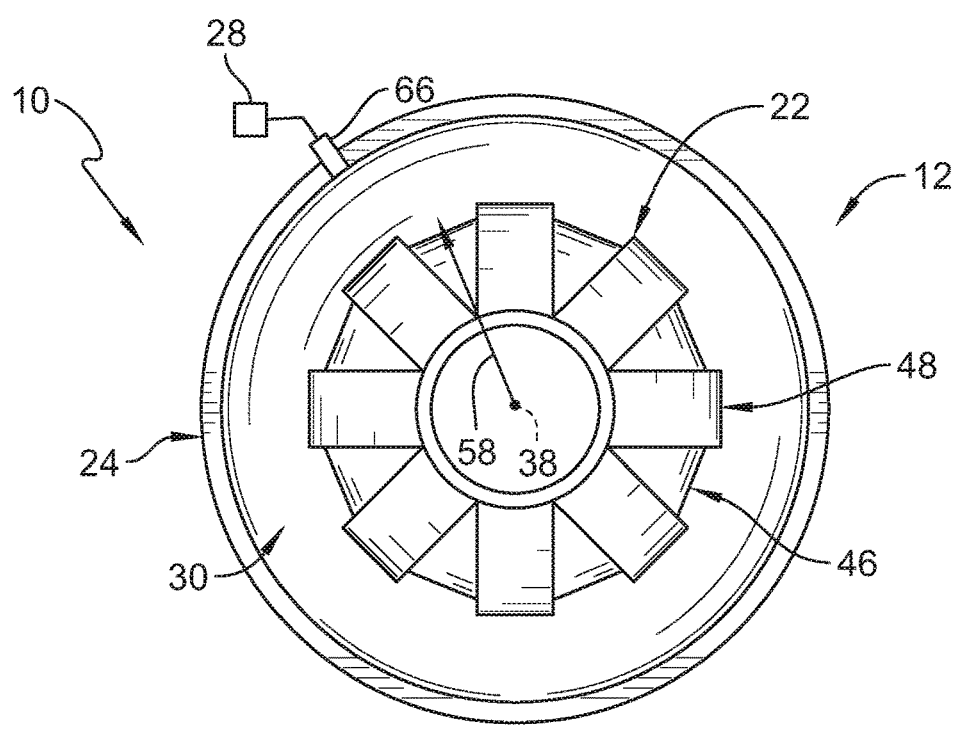
FIG. 6 is a front elevation view of the particle separator in the austere arrangement in which the inner slats are misaligned circumferentially with the outer slats to cause the particle separator to have the large maximum effective radius and a small inlet passageway area.

When particulates are present, such as, in austere conditions, it may be desirable to have an inner profile with a large maximum effective radius 58 so that the flow area (sectioned radially along the same point on the axis 38) is smaller as suggested in FIGS. 4 and 6. The control system 28 is configured to adjust the adaptive-area hub 22 to vary the flow area by varying the maximum effective radius of the adaptive-area hub 22 in response to detecting austere and non-austere conditions.

The adaptive-area hub 22 includes an inner wall 44, a plurality of inner slats 46, and a plurality of outer slats 48 as shown in FIGS. 2-4. The inner wall 44 is arranged around the axis 38. The plurality of inner slats 46 are arranged circumferentially about the inner wall 44. The plurality of outer slats 48 are arranged circumferentially about the plurality of inner slats 46 and the inner wall 44.

The inner wall 44 is continuous and fully annular in the illustrative embodiment and includes a curvilinear outer surface as shown in FIGS. 3 and 4. The inner wall 44 defines a first maximum radius relative to the axis 38 and a first engine-channel angle.

Each of the plurality of inner slats 46 extend axially and have a relatively small radial thickness as shown in FIGS. 2-4. Each of the plurality of inner slats 46 has a circumferential width. Each of the plurality of inner slats 46 is spaced apart circumferentially from neighboring inner slats 46 to define a circumferential gap between each neighboring pair of inner slats 46 as shown in FIG. 2. The plurality of inner slats 46 are configured to rotate relative to the plurality of outer slats 48. Each of the plurality of inner slats 46 is made of a curvilinear strip of material.

Each of the plurality of inner slats 46 includes a curvilinear outer surface as shown in FIGS. 3 and 4. The inner slats 46 define a second maximum radius relative to the axis 38 and a second engine-channel angle. The second maximum radius is greater than the first maximum radius. The second engine-channel angle is greater than the first engine-channel angle in the illustrative embodiment. The plurality of inner slats 46 are spaced apart radially from the inner wall 44 at the axial location of the second maximum radius as shown in FIG. 3.

Each of the plurality of outer slats 48 extend axially and have a relatively small radial thickness as shown in FIGS. 2-4. Each of the plurality of outer slats 48 has a circumferential width. The circumferential width of the outer slats 48 is about equal to the circumferential width of the inner slats 46 in the illustrative embodiment. Each of the plurality of outer slats 48 is made of a curvilinear strip of material.

Figure 5:
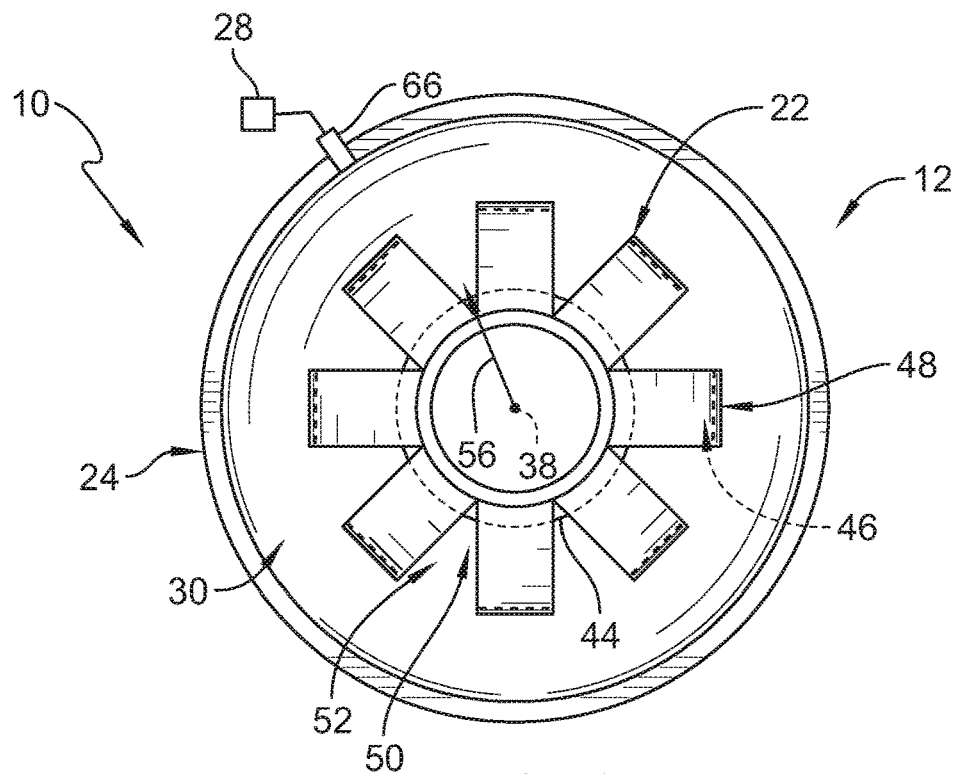
FIG. 5 is a front elevation view of the particle separator in the non-austere arrangement in which the inner slats are aligned circumferentially with the outer slats to cause the particle separator to have the small maximum effective radius and large inlet passageway area.

Each of the plurality of outer slats 48 is spaced apart circumferentially from neighboring outer slats 48 to define a circumferential gap between each neighboring pair of outer slats 48 as shown in FIGS. 2 and 5. The plurality of outer slats 48 are fixed in position relative to the outer wall 24 in the illustrative embodiment. In other embodiments, the plurality of inner slats 46 may be fixed in position relative to the outer wall 24 and the plurality of outer slats 48 may rotate relative to the inner slats 46.

Each of the plurality of outer slats 48 includes a curvilinear outer surface as shown in FIGS. 3 and 4. The outer slats 48 define a third maximum radius and a third engine-channel angle. The third maximum radius is greater than the second maximum radius. As a result, the inner slats 46 fit radially between the outer slats 48 and the inner wall 44 when the inner slats 46 are aligned circumferentially with the outer slats 48 as shown in FIGS. 3 and 5. The difference between the third maximum radius and the second maximum radius may be minimized to reduce a size of a radial gap formed between the outer slats 48 and the inner slats 46. The third engine-channel angle is greater than the second engine-channel angle in the illustrative embodiment.

The plurality of inner slats 46 is rotatable about the axis 38 relative to the plurality of outer slats 48 between a non-austere position and an austere position as suggested in FIGS. 5 and 6. In the non-austere position, the control system 28 moves the plurality of inner slats 46 to be aligned circumferentially with the plurality of outer slats 48 so that the inner wall 44 provides the inner profile of the particle separator 12 as shown in FIG. 5. As a result, the adaptive-area hub 22 has the small maximum effective radius 56 and the large flow area.

In the austere position, the control system 28 moves the plurality of inner slats 46 to be misaligned circumferentially with the plurality of outer slats 48 so that the plurality of inner slats 46 and the plurality of outer slats 48 provide the inner profile of the particle separator 12 as shown in FIG. 6. As a result, the adaptive-area hub 22 has the large maximum effective radius 58 and the small flow area. In some embodiments, the inner wall 44 is coupled to the plurality of inner slats 46 for rotation therewith.

The splitter 26 is located aft of the adaptive-area hub 22 as shown in FIGS. 3 and 4. The splitter 26 cooperates with the adaptive-area hub 22 to define an engine channel 32 between the splitter 26 and the adaptive-area hub 22 as shown in FIGS. 3 and 4. The splitter 26 cooperates with the outer wall 24 to define the scavenge channel 34 between the splitter 26 and the outer wall 24. The splitter 26 is fixed in position relative to the outer wall 24 in the illustrative embodiments.

The splitter 26 separates the flow of air and particles that are conducted into the air-inlet passageway into the clean flow 40 and the dirty flow 42 as suggested in FIGS. 3 and 4. The clean flow 40 is conducted to the compressor section 14 via the engine channel 32. The dirty flow 42 is conducted to the scavenge channel 34. The scavenge channel 34 may conduct the dirty flow 42 to environment outside the engine 10.

In use, inlet flow 36 is conducted into the air-inlet passageway 30 of the particle separator 12 as suggested in FIG. 3. In non-austere conditions, the geometry of the adaptive-area hub 22 assumes the non-austere arrangement so that the flow area is maximized to provide a low pressure loss flow path which may be beneficial for engine performance. The inner slats 46 are aligned circumferentially with the outer slats 48 as shown in FIG. 5. As a result, the adaptive-area hub 22 has the small first maximum effective radius 56 and large flow area and the inlet flow 36 is free to flow through the gaps formed between adjacent inner slats 46 and outer slats 48 as suggested in FIG. 3.

The control system 28 is configured to detect the presence of the particles suspended in the inlet flow 36 and to move selectively the inner slats 46 between the non-austere position, shown in FIG. 3, and the austere position, shown in FIG. 4. In austere conditions, the geometry of the adaptive-area hub 22 provides the second maximum effective radius 58 which is larger than the first maximum effective radius 56 which decreases the flow area in the particle separator to increase velocity and encourage particulates into the scavenge channel 34.

In particular, the inner slats 46 rotate to be misaligned circumferentially with the outer slats 48 so that the gaps between the outer slats 48 are blocked by the inner slats 46 in the austere position as shown in FIG. 6. As a result, inlet flow 36 is blocked from going through the gaps and goes radially around the inner slats 46 and the outer slats 48 as suggested in FIG. 4.

In some embodiments, the control system 28 includes a sensor 66 located in the air-inlet passageway 30 so that the control system 28 detects the particles in the air-inlet passageway 30. In some embodiments, the sensor 66 is located in the engine channel 32 so that the control system 28 detects the particles in the engine channel 32. In some embodiments, sensor 66 is located in the scavenge channel 34 so that the control system 28 detects the particles in the scavenge channel 34.

The illustrative particle separator 12 comprises a radially inward turning particle separator 12 as shown in FIG. 3. In other embodiments, the particle separator 12 comprises an inward turning particle separator, outward turning particle separator, linear type particle separator, dual path type particle separator, multi-path particle separators, or any combination thereof.

A method in accordance with the present disclosure includes providing the particle separator 12. The particle separator 12 includes the adaptive-area hub 22, the outer wall 24 arranged around the adaptive-area hub 22 to define the inlet passageway 30, and the splitter 26.

The adaptive-area hub includes the inner wall 44, the plurality of outer slats 48 located between the inner wall 44 and the outer wall 24, and the plurality of inner slats 46 located between the plurality of outer slats 48 and the inner wall 44. Each of the plurality of outer slats 48 is spaced apart from a neighboring outer slat 48 of the plurality of outer slats 48 to define the plurality of outer gaps 52 between the plurality of outer slats 48. Each of the plurality of inner slats 46 is spaced apart from a neighboring inner slat 46 of the plurality of inner slats 46 to define the plurality of inner gaps 50 between the plurality of inner slats 46.

The method further including moving the plurality of inner slats 46 relative to the plurality of outer slats 48 to cause the plurality of inner gaps 50 to be misaligned with the plurality of outer gaps 52 as suggested in FIG. 6. The method may further include moving the plurality of inner slats 46 relative to the plurality of outer slats 48 to cause the plurality of inner gaps 50 to be aligned with the plurality of outer gaps 52 as suggested in FIG. 5. The moving steps may include rotating the plurality of inner slats 46 relative to the plurality of outer slats 48. The moving steps may include rotating the plurality of outer slats 48 relative to the plurality of inner slats 46.

Figure 7:
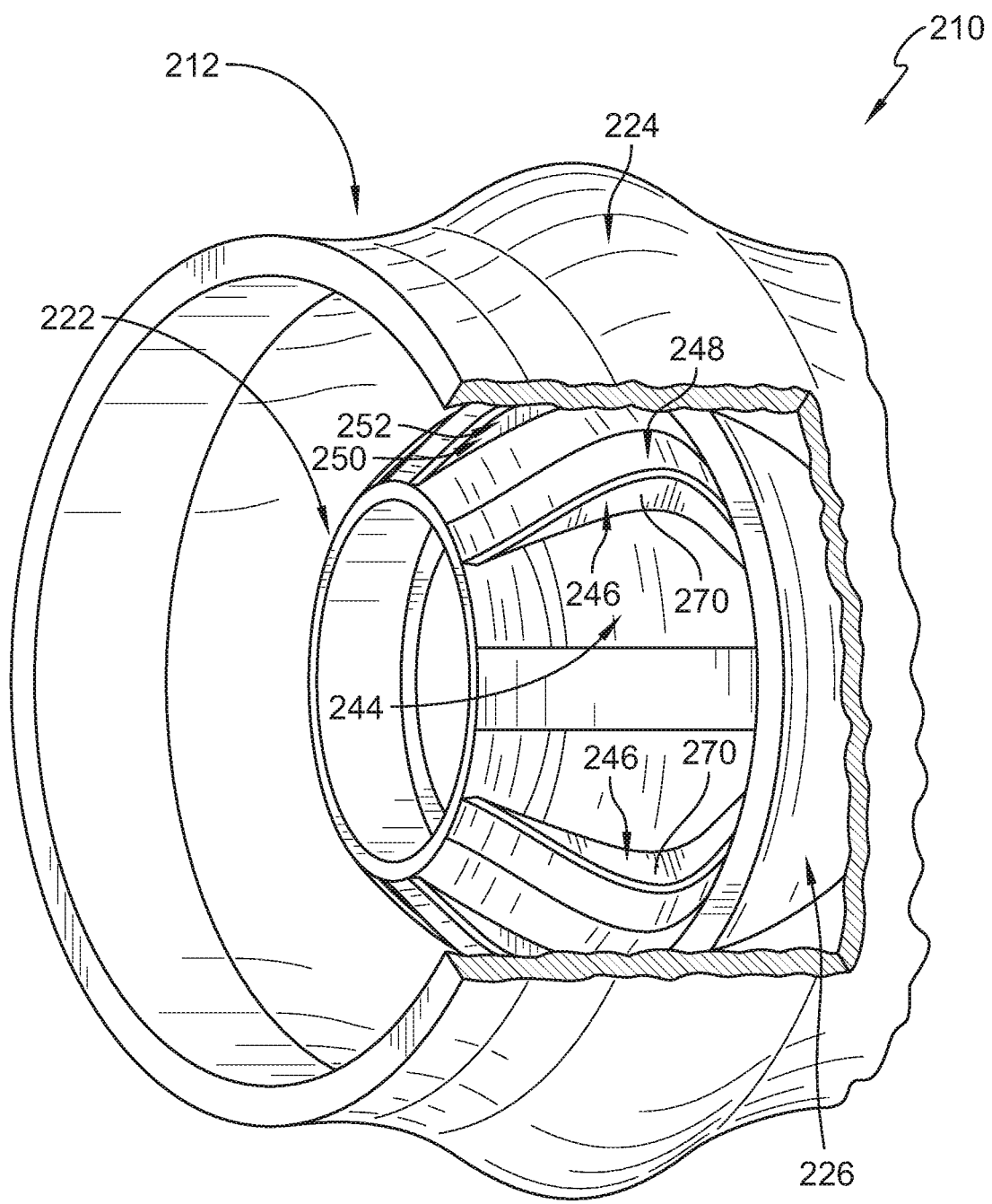
FIG. 7 is a perspective view of another particle separator adapted for use with the gas turbine engine of FIG. 1 showing that the particle separator includes an adaptive-area hub having an inner wall, a plurality of inner slats that extend radially outward away from the inner wall, and a plurality of outer slats.

An embodiment of a particle separator 212 in accordance with the present disclosure is shown in FIG. 7. The particle separator 212 is substantially similar to the particle separator 12 shown in FIGS. 1-6 and described herein. Accordingly, similar reference numbers in the 200 series indicate features that are common between the particle separator 12 and the particle separator 212. The description of the particle separator 12 is incorporated by reference to apply to the particle separator 212, except in instances when it conflicts with the specific description and the drawings of the particle separator 212.

The particle separator 212 includes an adaptive-area hub 222, an outer wall 224, and a splitter 226 as shown in FIG. 7. The particle separator 212 further includes the control system 28. The adaptive-area hub 222 includes an inner wall 244, a plurality of inner slats 246, and a plurality of outer slats 248. The plurality of inner slats 246 extend radially inward and couple to the inner wall 244 for movement with the inner wall 244. The plurality of inner slats 246 and the inner wall 244 are integrally formed in the illustrative embodiment.

As shown in FIG. 7, the inner slats 246 are solid and include radially extending side walls 270. The side walls extend radially inward toward the inner wall 244 and couple with the inner wall 244. In the illustrative embodiment, the inner slats 246 and the inner wall 244 are integrally formed to provide a monolithic component.

Fixed and rotary wing aircraft may operate in particulate laden environments such as deserts or beach areas. Small particulates can affect aircraft gas turbine engines, whether during conventional takeoff/landing or vertical take-off and landing. In flight, engines may ingest ice crystals or volcanic ash. Some of these engines may use filters to remove particulates from entering the gas turbine engine and therefore protect the hot section hardware from damage.

In the present application, the engine 10 includes an inertial particle separator (IPS) to remove a significant portion of particulates and expel them via a scavenge duct system outside of the aircraft. Aircraft may particle separators 12 with turboshaft gas turbine engines to power the rotor blades and the inertial particle separators may be located ahead of the engine and part of the inlet duct system. As shown in FIGS. 3 and 4, atmospheric air enters the inlet passageway "inflow" and the flow bifurcates into the engine inlet flow "core flow" and the bypass "scavenge flow" that carries the particulates away from the engine inlet by dumping the flow overboard.

Two approaches may be used increase the amount of particulates that are removed from an inertial particle separator. The scavenge ratio may be increased to increase the capture of particles into the scavenge duct. The flow turning may be increased to force more particles into the scavenge duct.

The scavenge ratio may be calculated as the ratio of the amount of flow entering the scavenge duct to the total flow entering the inlet. The amount of scavenge flow may be limited by the amount of the inlet flow the engine requires. Once this limit has been reached, another available option may be to increase the amount of flow turning in the duct.

The more the flow turning, the more particulates are forced into the scavenge duct. This increase in turning may be accomplished by increasing the maximum radial height of the hub of the inner wall from the horizontal direction. The more flow turning may result in higher pressure losses in the flow that enters the engine.

It may be desirable to have the hub at a high flow turning position only when particulates are present (austere conditions). When no particulates are present (non-austere environment), the pressure loss may be much lower. This may be effective by changing the curvature of the hub surface. The present disclosure provides an approach to achieving this by incorporating a radially variable geometry hub into an inertial particle separator flow path. When particulates are present, the hub would reduce a flow area to force particulates into the scavenge duct. When in non-austere conditions, the hub geometry would retract to provide a larger flow area and a low pressure loss flow path. The present disclosure is applicable for inertial particle separators in turboshaft or turbofan applications.

A sensor could be used to detect the presence of particulates. An actuator could be used to vary the hub geometry for austere conditions and non-austere conditions. The use of scavenge flow may control pressure loss due to possible excessive diffusion.

In some embodiments, the flow path area could be changed by using rotating concentric stream wise rose of slats. In austere conditions, the inner slats rotate to close off the hub surface, creating a large local surface curvature and small flow area as shown in FIGS. 4 and 6. In non-austere conditions, the inner slats rotate under the outer slats, thus, creating an aerodynamic surface of low curvature and large flow area as shown in FIGS. 3 and 5.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A particle separator for use with a gas turbine engine, the particle separator comprising
    an adaptive-area hub arranged circumferentially about an axis of the particle separator to define an inner profile of the particle separator, the adaptive-area hub includes an inner wall arranged circumferentially about the axis, a plurality of outer slats arranged circumferentially about the inner wall, and a plurality of inner slats located radially between the inner wall and the plurality of outer slats,
    an outer wall arranged circumferentially about the adaptive-area hub to define an inlet passageway between the outer wall and the adaptive-area hub, the inlet passageway adapted to receive a mixture of air and particles suspended in the air, and
    a splitter located aft of the adaptive-area hub and configured to separate the mixture of air and particles into a clean flow substantially free of particles and a dirty flow containing the particles during operation of the particle separator,
    wherein the adaptive-area hub is configured to move between a non-austere position in which the plurality of inner slats is aligned circumferentially with the plurality of outer slats to cause the inner wall to provide the inner profile of the particle separator such that the inlet passageway has a first area and an austere position in which the plurality of inner slats is misaligned circumferentially with the plurality of outer slats to cause the plurality of inner slats and the plurality of outer slats to cooperate to provide the inner profile of the particle separator such that the inlet passageway has a second area smaller than the first area to encourage the particles into the dirty flow.

2. The particle separator of claim 1, wherein each of the plurality of outer slats is spaced apart circumferentially from a neighboring outer slat of the plurality of outer slats by an outer gap such that the plurality of outer slats define a plurality of outer gaps.

3. The particle separator of claim 2, wherein the plurality of inner slats are positioned relative to the plurality of outer slats to close the plurality of outer gaps to block fluid flow radially through the plurality of outer gaps when the adaptive-area hub is in the austere position.

4. The particle separator of claim 2, wherein each of the plurality of outer slats has a first circumferential width and each of the plurality of inner slats has a second circumferential width and the first circumferential width is about equal to the second circumferential width.

5. The particle separator of claim 4, wherein each of the plurality of outer slats is made of a strip of material.

6. The particle separator of claim 4, wherein each of the plurality of inner slats is made of a strip of material.

7. The particle separator of claim 1, further comprising a control system configured to detect the presence of the particles suspended in the air and to move selectively the adaptive-area hub from the non-austere position to the austere position in response to detecting the presence of the particles suspended in the air.

8. The particle separator of claim 1, wherein each of the plurality of outer slats and each of the plurality of inner slats are curvilinear.

9. The particle separator of claim 8, wherein the plurality of inner slats have a maximum radius relative to the axis and the inner wall is spaced apart from the plurality of inner slats at an axial position corresponding with the maximum radius.

10. The particle separator of claim 8, wherein the plurality of inner slats are coupled to the inner wall for rotational movement with the inner wall relative to the axis.

11. A particle separator comprising
    an adaptive-area hub that includes an inner wall, a plurality of outer slats spaced apart from the inner wall, and a plurality of inner slats located between the plurality of outer slats and the inner wall, each of the plurality of outer slats is spaced apart from a neighboring outer slat of the plurality of outer slats to define a plurality of outer gaps, each of the plurality of inner slats is spaced apart from a neighboring inner slat of the plurality of inner slats to define a plurality of inner gaps,
    an outer wall spaced apart from the inner wall to locate the plurality of outer slats between the inner wall and the outer wall, and
    a splitter located aft of the adaptive-area hub,
    wherein the adaptive-area hub is movable between a non-austere position in which the plurality of inner slats and the plurality of outer slats are positioned relative to each other to cause the plurality of outer gaps and the plurality of inner gaps to be aligned and an austere position in which the plurality of inner slats and the plurality of outer slats are positioned relative to each other to cause the plurality of outer gaps and the plurality of inner gaps to be misaligned.

12. The particle separator of claim 11, wherein the adaptive-area hub is arranged circumferentially about an axis of the particle separator.

13. The particle separator of claim 11, wherein the plurality of inner slats are coupled to the inner wall for movement with the inner wall.

14. The particle separator of claim 13, wherein each of the plurality of inner slats include side walls that extend away from the plurality of outer slats and toward the inner wall and the side walls are couple with the inner wall.

15. The particle separator of claim 11, wherein each of the plurality of outer slats have a first width and each of the plurality of inner slats have a second width and the first width is about equal to the second width.

16. The particle separator of claim 11, wherein the inner wall is annular and continuous.

17. The particle separator of claim 11, further comprising a control system configured to move selectively the adaptive-area hub from the non-austere position to the austere position in response to detecting a presence of particles suspended in air flowing through the particle separator.

18. A method comprising
providing a particle separator that includes an adaptive-area hub, an outer wall arranged around the adaptive-area hub to define an inlet passageway, and a splitter, the adaptive-area hub including an inner wall, a plurality of outer slats located between the inner wall and the outer wall, and a plurality of inner slats located between the plurality of outer slats and the inner wall, each of the plurality of outer slats is spaced apart from a neighboring outer slat of the plurality of outer slats to define a plurality of outer gaps between the plurality of outer slats, and each of the plurality of inner slats is spaced apart from a neighboring inner slat of the plurality of inner slats to define a plurality of inner gaps between the plurality of inner slats, and moving the plurality of inner slats relative to the plurality of outer slats to cause the plurality of inner gaps to be misaligned with the plurality of outer gaps.

19. The method of claim 18, further comprising moving the plurality of inner slats relative to the plurality of outer slats to cause the plurality of inner gaps to be aligned with the plurality of outer gaps.

20. The method of claim 18, wherein the moving step includes rotating the plurality of inner slats relative to the plurality of outer slats.

* * * * *